United States Patent [19]
Kotani

[11] Patent Number: 5,915,786
[45] Date of Patent: Jun. 29, 1999

[54] SEAT SUPPORT MECHANISM FOR SIMULATION APPARATUS

[75] Inventor: Hideki Kotani, Kobe, Japan

[73] Assignee: Konami Co., Ltd., Hyogo-ken, Japan

[21] Appl. No.: 08/905,446

[22] Filed: Aug. 4, 1997

[30] Foreign Application Priority Data

Aug. 6, 1996 [JP] Japan .................................. 8-207462

[51] Int. Cl.⁶ ............................................. A47C 7/62
[52] U.S. Cl. ..................... 297/217.7; 472/135
[58] Field of Search .................... 472/135, 130; 297/217.7, 217.3, 217.1, 325, 330, 344.1, 344.12, 344.13, 344.14, 344.15, 344.17, 181, 344.4, 344.21; 248/398

[56] References Cited

U.S. PATENT DOCUMENTS

| | | | |
|---|---|---|---|
| 2,661,954 | 12/1953 | Koci .................................. | 297/217.7 X |
| 4,995,603 | 2/1991 | Reed ....................................... | 472/130 |
| 5,022,708 | 6/1991 | Nordella et al. ..................... | 297/330 X |
| 5,415,589 | 5/1995 | Hall, Jr. . | |
| 5,722,897 | 3/1998 | Engstrand ............................. | 472/130 |
| 5,765,910 | 6/1998 | Larkin et al. ..................... | 297/344.1 X |
| 5,772,513 | 6/1998 | Ohishi ..................................... | 472/130 |

FOREIGN PATENT DOCUMENTS

| | | |
|---|---|---|
| 392014 | 10/1990 | European Pat. Off. . |
| 697229 | 2/1996 | European Pat. Off. . |
| 694896 | 1/1996 | France . |
| 3032250 | 4/1982 | Germany . |
| 4109827 | 10/1992 | Germany . |

OTHER PUBLICATIONS

Patent Abstracts Of Japan, vol. 096, No. 007, Jul. 31, 1996 & JP 08 076678 A (NAMCO Ltd), Mar. 22, 1996.

Primary Examiner—Milton Nelson, Jr.
Attorney, Agent, or Firm—Jordan and Hamburg LLP

[57] ABSTRACT

A simulation apparatus having a steering wheel includes a seat for the operator to be seated thereon, a support base supporting the seat thereon, and a swing frame supported on the support base for angular movement about a vertical axis, the seat being supported on the swing frame for angular movement about a horizontal axis transverse to the vertical axis. A support frame supports the seat in spaced relation to the vertical axis, the support frame having a curved surface which supports the seat through two movable points which are symmetrical with respect to a center of the seat. A linkage is operatively coupled to the steering wheel and the swing frame for moving the seat in response to operation of the steering wheel.

21 Claims, 8 Drawing Sheets

SEAT SUPPORT MECHANISM FOR SIMULATION APPARATUS

BACKGROUND OF THE INVENTION

1. Field of the Invention

The present invention relates to a seat support mechanism for a simulation apparatus, and more particularly to a seat support mechanism for angularly moving a seat about a vertical axis and tilting the seat about a horizontal axis in response to operation of an input unit of a simulation apparatus.

2. Prior Art

Simulation apparatus generally comprise a main assembly including an input unit and a display monitor unit, a seat for a trainee or a player to be seated on in confronting relation to the main assembly, and a support base on which the seat is supported. In operation, a trainee or a player is seated on the seat, and operates the input unit while seeing images displayed on the display monitor unit to engage in various training practices, including the driving of a simulated automobile or motorcycle, the navigation of a simulated ship, the flight of an aircraft for maneuver, combat, and competition, or to play various video games.

Heretofore, it has been customary to fix the seat to the support base. However, it has been proposed to apply vibrations corresponding to impact shocks to the seat, or move the seat horizontally or vertically and tilt the seat about a horizontal axis normal to the display monitor unit, depending on how the training exercise or game develops, so that the trainee or player can feel realistic about the training exercise or game.

Some simulation apparatus with a movable seat have the main assembly movable in unison with the seat. In other simulation apparatus, only the seat is movable to make the entire simulation apparatus smaller in size and weight.

In those proposed simulation apparatus, the seat is vibratable, moveable horizontally and vertically, and tiltable. However, none of the conventional simulation apparatus have allowed the seat to move in a manner to give the trainee or the player a horizontal motion and at the same time a tilt caused thereby when the trainee or the player steers a simulated automobile or motorcycle to make a turn on the display monitor unit.

SUMMARY OF THE INVENTION

It is therefore an object of the present invention to provide a seat support mechanism for a simulation apparatus, which can angularly move a seat about a vertical axis and also tilt the seat about a horizontal axis in response to operation of an input unit of the simulation apparatus.

According to the present invention, there is provided a simulation apparatus comprising a main assembly including an input unit operable by an operator, a seat for the operator to be seated thereon in confronting relation to the input unit, a support base supporting the seat thereon, a swing frame supported on the support base for angular movement about a vertical axis, the seat being supported on the swing frame for angular movement about a horizontal axis transverse to the vertical axis, a support frame supporting the seat in spaced relation to the vertical axis, the support frame having a curved surface which supports the seat through two movable points which are symmetrical with respect to a center of the seat, and a linkage for moving the seat in response to operation of the input unit.

According to the present invention, there is also provided a seat support structure for a simulation apparatus having a main assembly including an input unit operable by an operator, comprising a seat for the operator to be seated thereon, a support base supporting the seat thereon, a swing frame supported on the support base for angular movement about a vertical axis, the seat being supported on the swing frame for angular movement about a horizontal axis transverse to the vertical axis, a support frame supporting the seat in spaced relation to the vertical axis, the support frame having a curved surface which supports the seat through two movable points which are symmetrical with respect to a center of the seat, and a linkage for moving the seat in response to operation of the input unit.

The linkage may comprise a mechanical linkage operatively coupled between the input unit and the swing frame.

Alternatively, the linkage may comprise a detector for detecting operation of the input unit, an actuator for actuating the swing frame, and a controller for controlling the actuator in response to an output signal from the detector.

The curved surface may comprise an upwardly convex upper surface, the two movable points comprising respective rollers rotatably mounted on the support frame in rolling contact with the upwardly convex upper surface.

Alternatively, the curved surface may comprise an upwardly concave upper surface, the two movable points comprising respective rollers rotatably mounted on the support frame in rolling contact with the upwardly concave upper surface.

Further alternatively, the curved surface includes two opposite slanted surfaces tapered downwardly in directions away from each other, the two movable points comprising respective rollers rotatably mounted on the support frame in rolling contact with the two opposite slanted surfaces, respectively.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

A seat support mechanism according to the present invention will be described below as being incorporated in a car driving game machine as a simulation apparatus shown in FIG. 1. However, the seat support mechanism according to the present invention may be incorporated in any of various other simulation apparatus.

Figure 1:
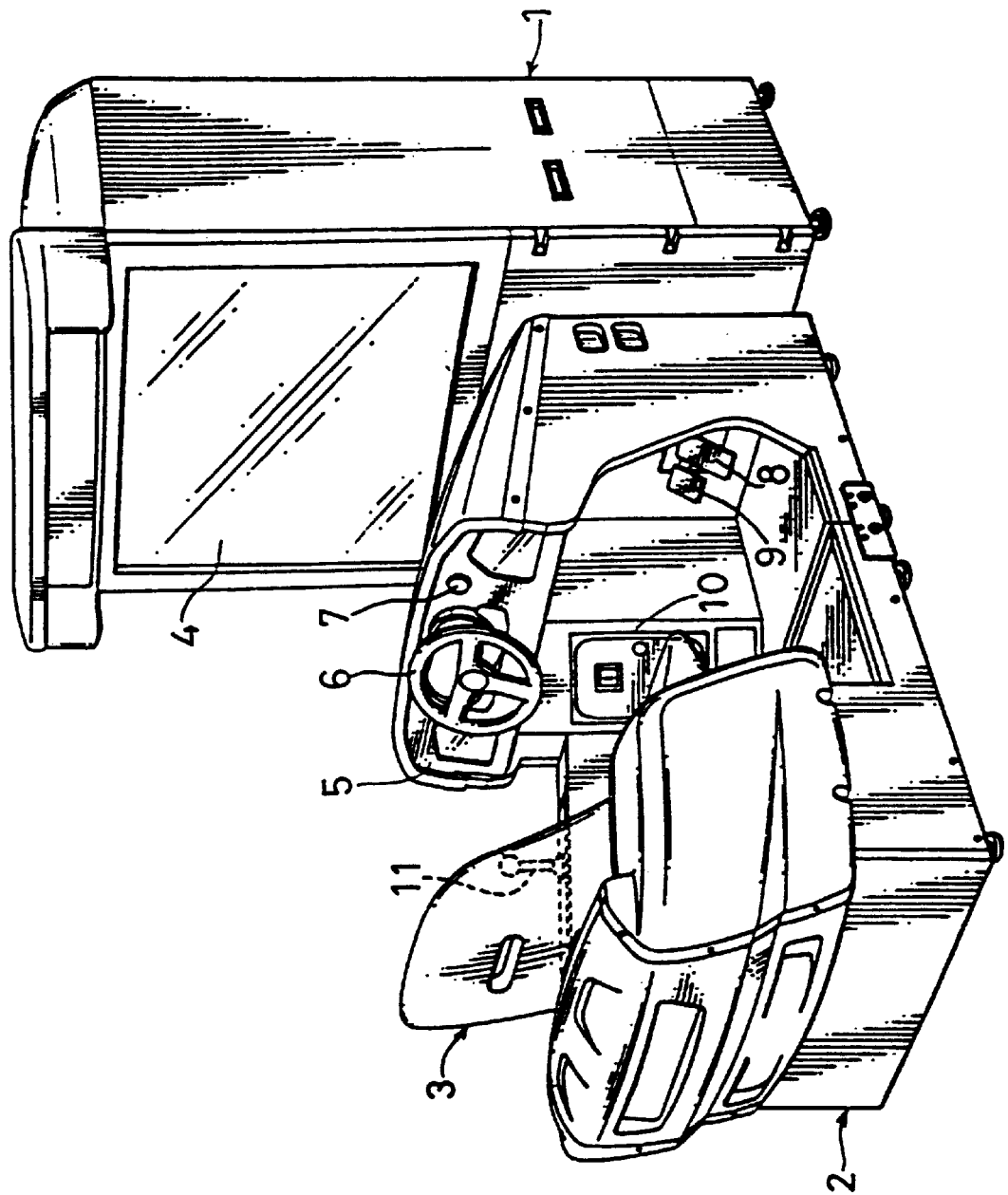
FIG. 1 is a perspective view of a simulation apparatus which incorporates a seat support mechanism according to the present invention.

As shown in FIG. 1, the car driving game machine generally comprises a display monitor unit 1, a support base 2 formed integrally with or connected to the display monitor unit 1 through a signal cable, and a seat 3 supported on the support base 2 for a game player to be seated thereon.

The display monitor unit 1 houses therein an image generating device (not shown) and has a vertical display screen 4 mounted on a front face thereof for displaying game images that are generated by the image generating device and optically enlarged. The support base 2 supports thereon a dashboard 5 positioned in front of the seat 3 in spaced relation thereto and supporting thereon various instruments (not shown) including a speedometer, a trip recorder, a score meter, etc., a steering wheel 6 as an input unit, and a start button 7. The support base 2 also has an accelerator pedal 8, a brake pedal 9, and a coin receiver 10 which are positioned below the dashboard 5, and a gearshift lever 11 that is disposed forwardly on the left-hand side of the seat 3.

Figure 2:
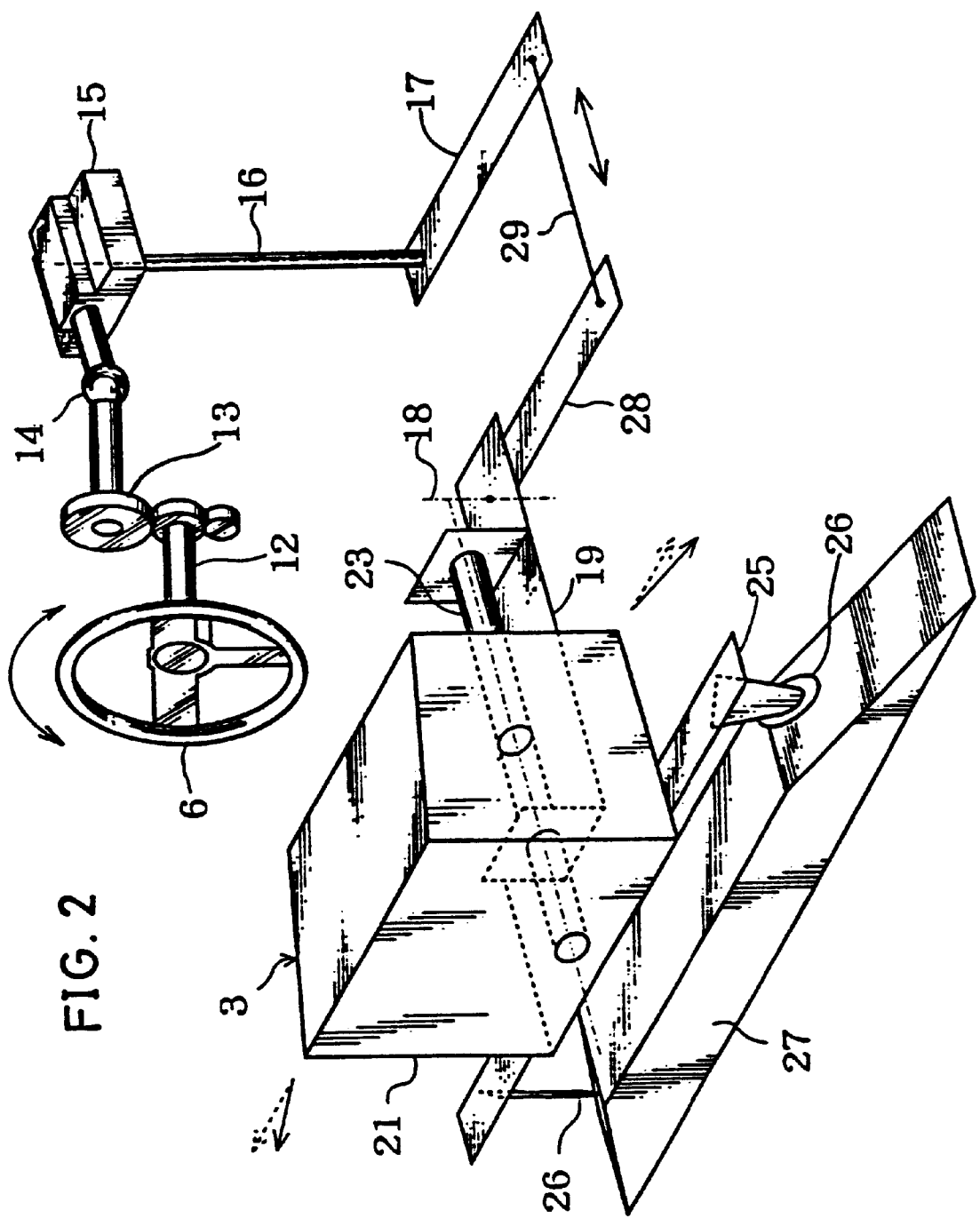
FIG. 2 is a perspective view of the seat support mechanism.
Figure 3:
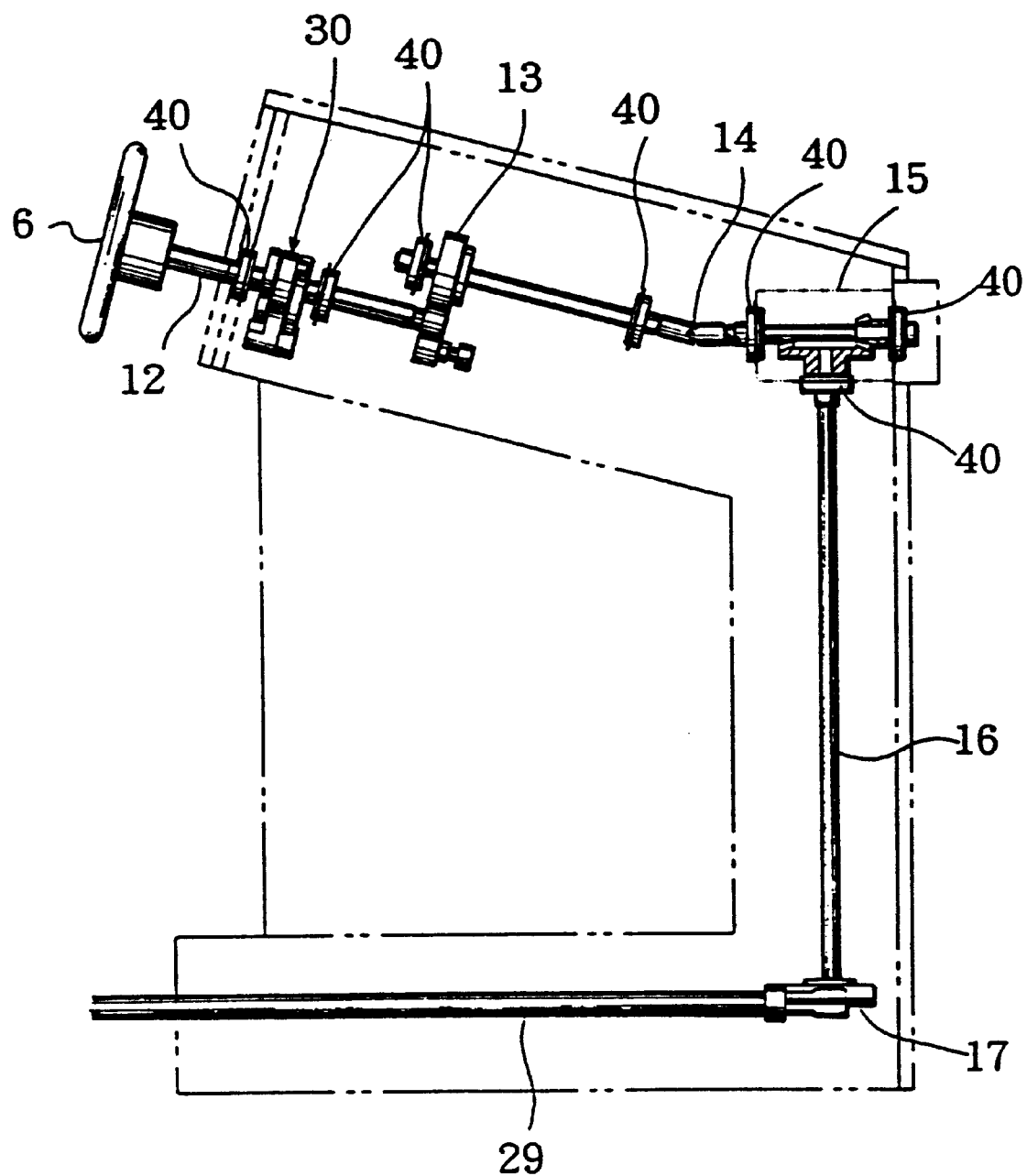
FIG. 3 is a side elevational view of a portion of the seat support mechanism.

As shown in FIGS. 2 and 3, the steering wheel 6 is mounted on the tip end of a steering shaft 12 which is operatively connected through a spur gear train 13, a universal joint 14, and a bevel gear train 15 to the upper end of a vertical rotatable shaft 16. A first lateral arm 17 is horizontally fixed to the lower end of the vertical rotatable shaft 16. The steering shaft 12, a shaft coupled to the universal joint 14, a shaft coupled to the bevel gear train 15, and the vertical rotatable shaft 16 are rotatably supported by bearings 40.

Figure 4:
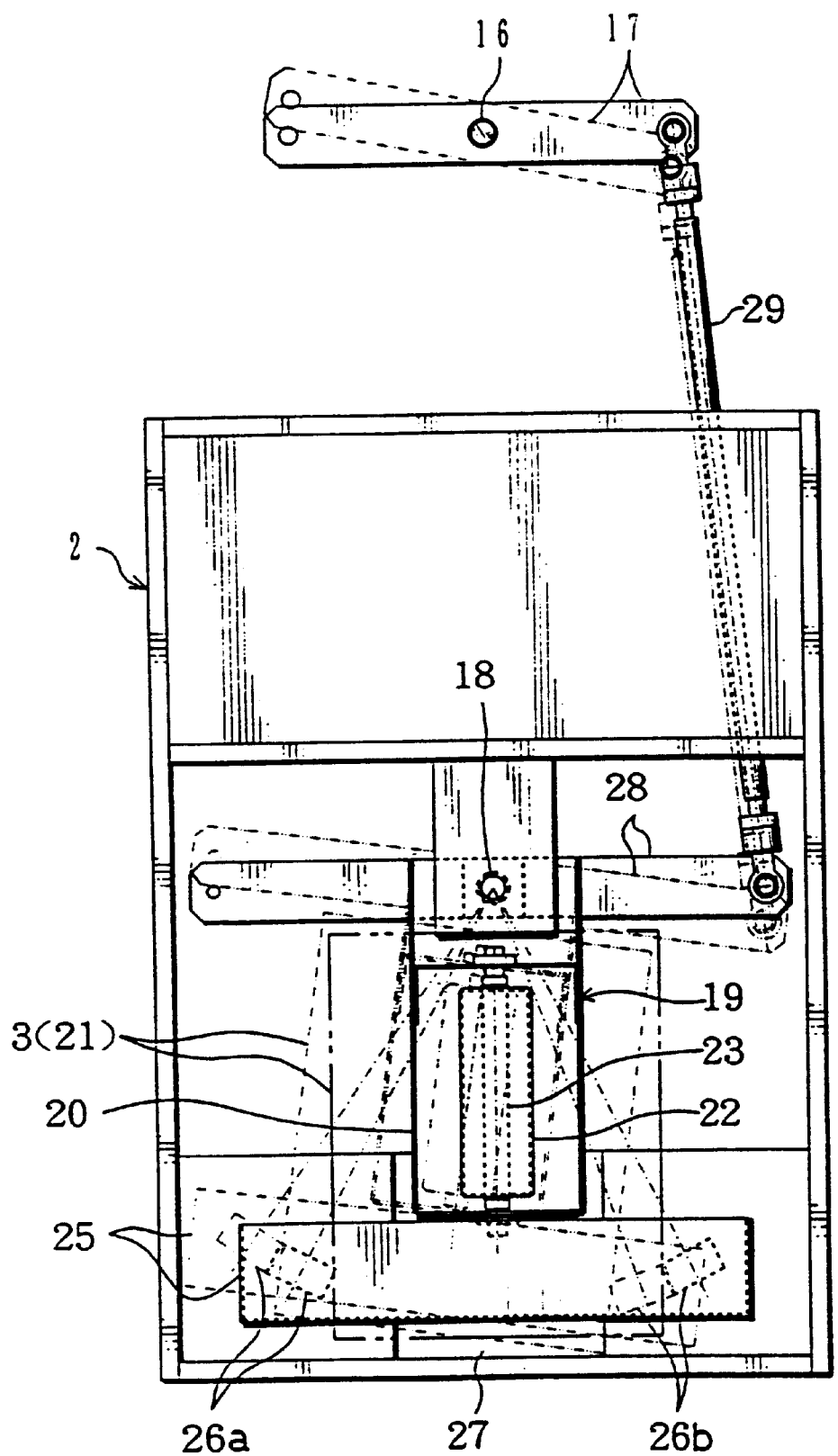
FIG. 4 is a plan view of the seat support mechanism.
Figure 5:
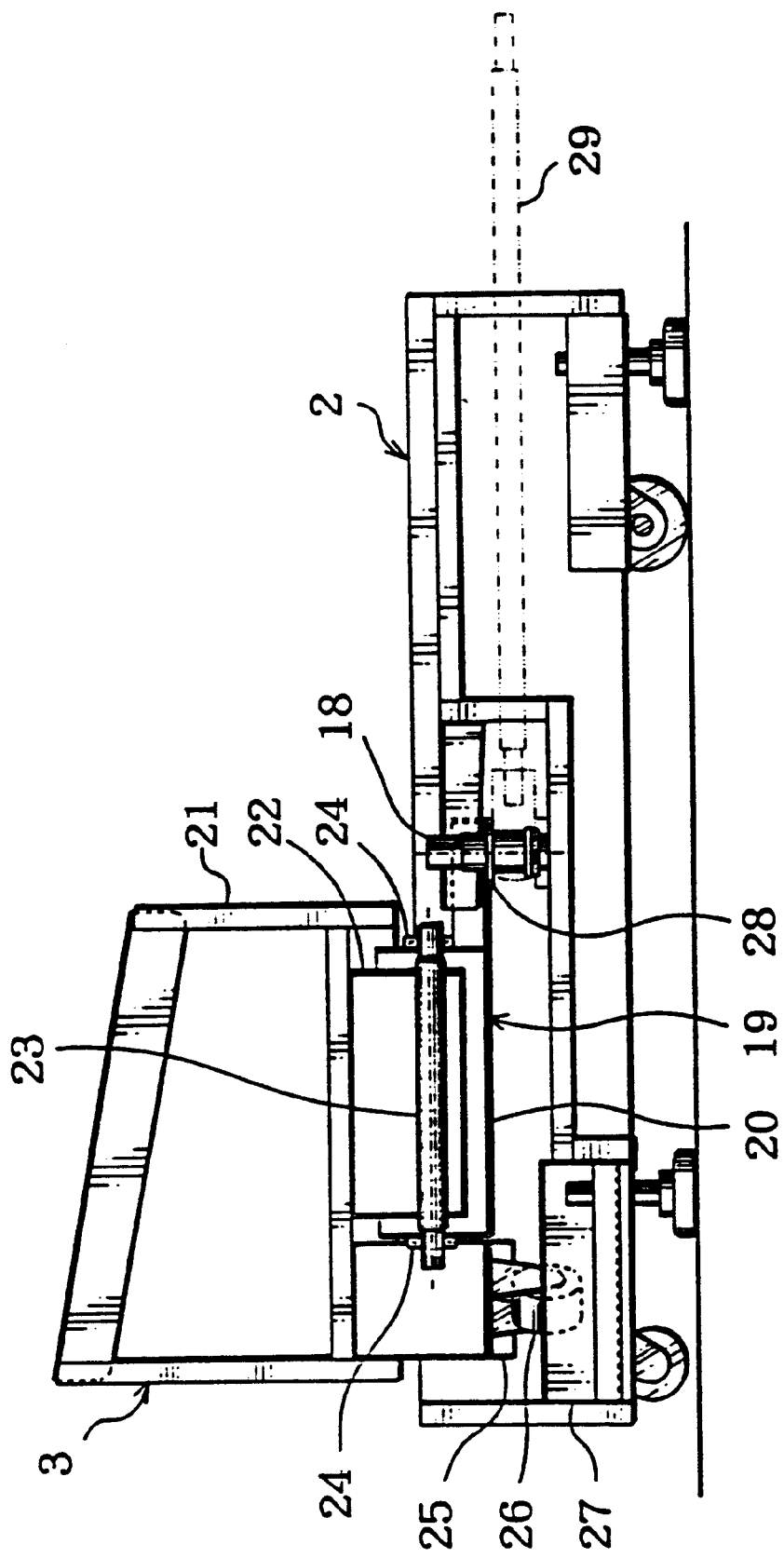
FIG. 5 is a side elevational view, partly in vertical cross section, of the seat support mechanism.

As shown in FIGS. 4 and 5, a vertical rotatable shaft 18 is mounted substantially centrally on the support base 2, and a swing frame 19 has a front end horizontally swingably supported on the vertical rotatable shaft 18.

The swing frame 19 includes a rear portion 20 comprising an upwardly open box in the form of a rectangular parallelepiped. The seat 3 has a seat frame 21 with a bracket 22 mounted on a lower portion thereof. The bracket 22 is positioned in the rear portion 20 and supported on a longitudinal shaft 23 which extends longitudinally through the bracket 22 and has front and rear ends rotatably supported on the rear portion 20 by respective bearings 24. A transverse beam 25 is fixed to a rear portion of the seat frame 21 behind the rear portion 20. Two rollers 26 are rotatably supported on the lower surfaces of opposite ends of the transverse beam 24 by respective shafts whose axes are directed toward the vertical rotatable shaft 18.

Figure 6:
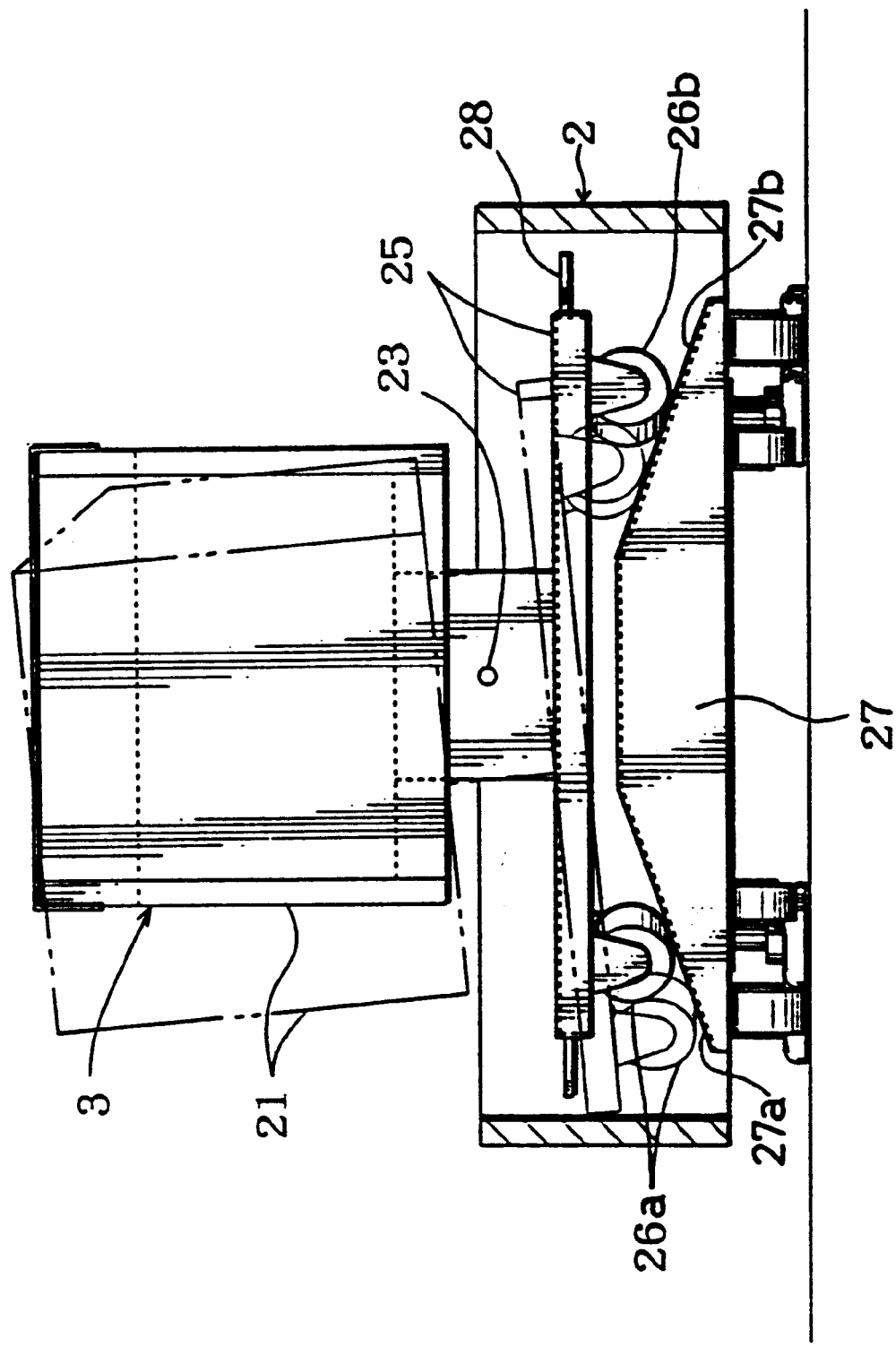
FIG. 6 is a rear elevational view, partly in vertical cross section, of the seat support mechanism.

As shown in FIGS. 4, 5, and 6, the rollers 26a, 26b rollingly ride on a support frame 27 mounted on the rear end of the support base 2 below the transverse beam 25. The support frame 27 is shaped like an isosceles trapezoid as viewed from behind, and has an upper surface including two opposite slanted surfaces 27a, 27b that are tapered downwardly in directions away from each other. The rollers 26a, 26b are rollingly placed on these opposite slanted surfaces 27a, 27b, as best shown in FIG. 6.

As shown in FIGS. 2 through 5, a second lateral arm 28, which extends substantially parallel to the first lateral arm 17, is centrally fixed to the vertically rotatable shaft 18. An end of the second lateral arm 28, which is the right-hand end as viewed from above in FIG. 4, and an end of the first lateral arm 17, which is the right-hand end as viewed from above in FIG. 4, are operatively coupled to each other by a joint rod 29.

When the steering wheel 6 is turned clockwise (FIG. 2) by the game player seated on the seat 3, the vertical rotatable shaft 16, the first lateral arm 17, and the second lateral arm 28 are angularly moved clockwise (FIG. 4) from a neutral position indicated by the solid lines in FIG. 4 to a position indicated by the imaginary lines in FIG. 4. The swing frame 19 is also angularly moved clockwise (FIG. 4) about the vertical rotatable shaft 18 from a neutral position indicated by the solid lines in FIG. 4 to a position indicated by the imaginary lines in FIG. 4.

The seat 3 and hence the seat frame 21 are also angularly moved clockwise (FIG. 4) in unison with the swing frame 19 about the vertical rotatable shaft 18 from a neutral position indicated by the solid lines in FIG. 4 to a position indicated by the imaginary lines in FIG. 4. At this time, because the seat frame 3 moves to the left in FIG. 6, the roller 26a rolls downwardly along the slanted surface 27a of the support frame 27, and the roller 26b rolls upwardly along the slanted surface 27b of the support frame 27. As a result, the seat 3 and hence the seat frame 21, while being angularly moved horizontally clockwise about the vertical rotatable shaft 18, are tilted downwarldy to the left about the longitudinal shaft 23 that is being turned horizontally clockwise about the vertical rotatable shaft 18. Therefore, the game player on the seat 3 is also moved to the left and tilted downwarldy to the left and feels forced to the left as if making a right turn by turning the steering wheel 6 clockwise.

Figure 7:
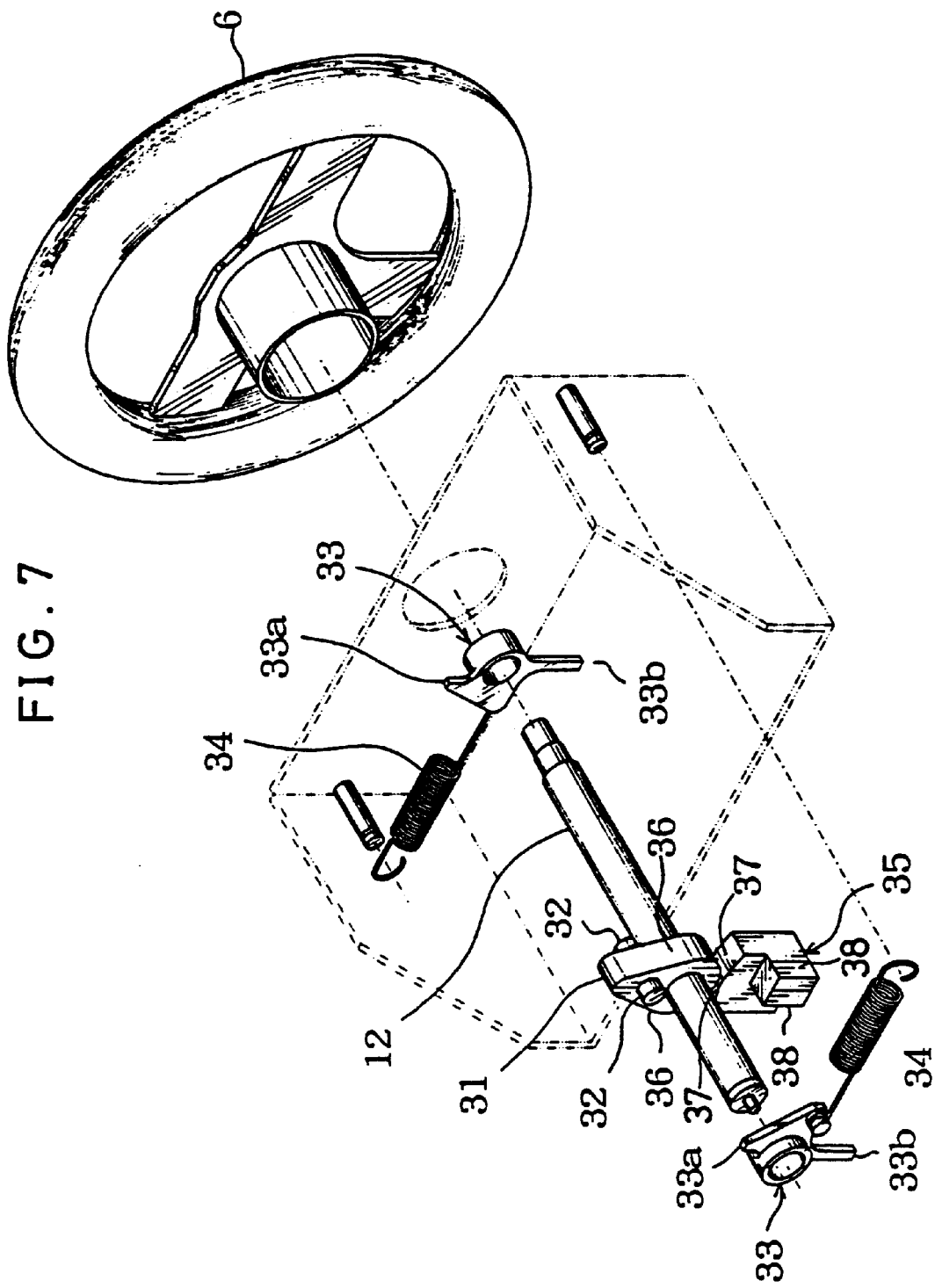
FIG. 7 is an exploded perspective view of an automatic return mechanism of the seat support mechanism.

As shown in FIGS. 3 and 7, the steering wheel 6 is combined with an automatic return mechanism 30 for automatically returning the steering wheel 6 to its neutral position. More specifically, as shown in FIG. 7, the automatic return mechanism 30 comprises a pair of front and rear eccentric pins 32 fixed to the steering shaft 12 by an arm 31, a pair of arm assemblies 33 rotatably fitted over the steering shaft 12 forwardly and rearwardly, respectively, of the arm 31, each of the arm assemblies 33 having an upper arm 33a and a lower arm 33b, and a pair of springs 34 for normally urging the upper arms 33a of the respective arm assemblies 33 against the corresponding pins 32, and a limiter 35 for limiting an angular range in which the steering shaft 12 is angularly movable about its own axis.

The limiter 35 has a pair of upper lateral limiting surfaces 37 for bearing respective lateral side surfaces 36 of the arm 31. When the steering wheel 6 and hence the steering shaft 12 are turned clockwise or counterclockwise through 135°, for example, one of the side surfaces 36 is borne by the corresponding one of the upper lateral limiting surfaces 37, preventing the steering wheel 6 and hence the steering shaft 12 from being further turned clockwise or counterclockwise. The limiter 35 also has a pair of lower vertical limiting surfaces 38.

When the steering wheel 6 and hence the steering shaft 12 are turned clockwise, for example, in FIG. 7, the front eccentric pin 32 (shown on the left) turns the arm assembly 33 clockwise, extending the spring 34 (shown on the left) which stores energy to bias the corresponding arm assembly 33 to turn counterclockwise. Therefore, when the steering wheel 6 which has been turned clockwise is released by the game player, the steering wheel 6 is automatically returned to the neutral position under the bias of the spring 34 (shown on the left).

When the arm assembly 33 (shown on the left) is returned to the neutral position, the lower arm 33b thereof engages the corresponding one of the lower vertical limiting surfaces 38 of the limiter 35. The arm assembly 33 remains in the neutral position even when the steering wheel 6 is turned counterclockwise from the neutral position.

The steering wheel 6 is operatively coupled to the swing frame 19 through a mechanical linkage which comprises the spur gear train 13, the universal joint 14, the bevel gear train 15, the vertical rotatable shaft 16, the first lateral arm 17, the joint rod 29, and the second lateral arm 28. Therefore, the seat 3 can be moved without response delays in response to operation of the steering wheel 6, and the game player seating on the seat 3 can feel highly realistic about the car driving game with respect to the manner in which the steering wheel 6 is turned.

The steering wheel 6 and associated components thereof may be designed as a speed-responsive power steering system that operates depending on a car speed established by the accelerator pedal 8, the brake pedal 9, and the gearshift lever 11, such that the steering wheel 6 provides a higher response at higher car speeds and a lower response at lower car speeds.

Figure 8:
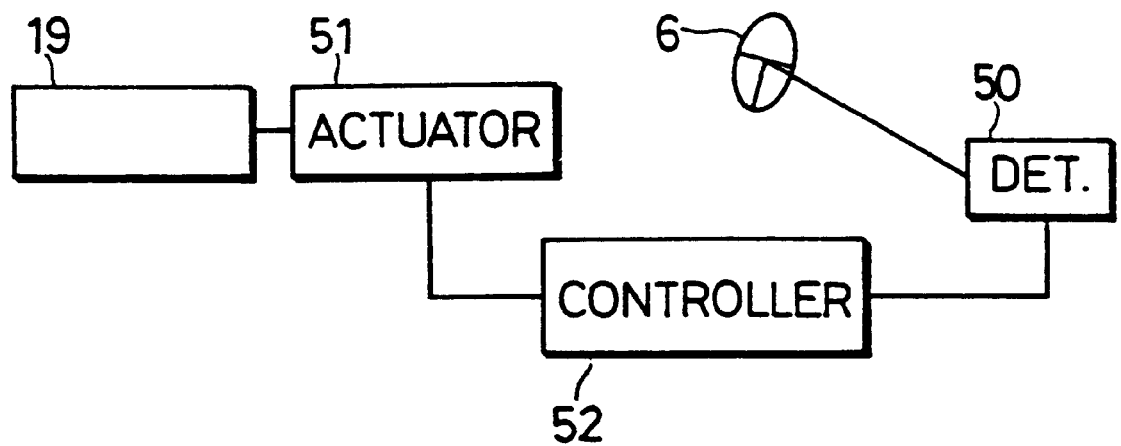
FIG. 8 is a block diagram of an electrical linkage according to another embodiment of the present invention.

The steering wheel 6 and the swing frame 19 may be operatively coupled to each other through an electrical linkage. For example, as shown in FIG. 8, such an electrical linkage may comprise a detector 50 such as a rheostat or a potentiometer for detecting a quantity of turning, e.g., an angular displacement or a speed of displacement, of the steering wheel 6, an actuator 51 such as a solenoid or an air cylinder for actuating the swing frame 19, and a controller 52 for controlling the actuator based on the quantity of turning of the steering wheel 6 as detected by the detector. If such an electrical linkage is employed, it is possible to change the response of the steering wheel 6 depending on a car speed that is calculated from the depth to which the accelerator pedal 8 is pressed and gear shift information produced by the gearshift lever 17.

At least one of the seat 3 (the seat frame 31), the swing frame 19, the second lateral arm 28, the joint rod 29, and the first lateral arm 17 may be associated with an automatic return mechanism (not shown) for automatically returning same to its neutral position.

In addition, the ratio of angular movement of the steering wheel 6 to angular movement of the swing frame 19 may be set to any desired value. For example, the speed reduction ratios of the spur gear train 13 and the bevel gear train 15 may be varied such that the swing frame 19 may be turned a relatively large angle in response to operation of the steering wheel 6 if the simulation apparatus comprises a motorcycle driving game machine where the steering wheel 6 is turned a relatively small angle.

Figure 9:
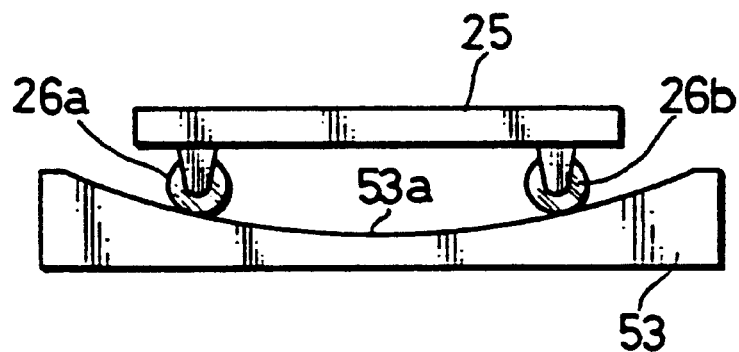
FIG. 9 is an elevational view of a support frame according to still another embodiment of the present invention.

As shown in FIG. 9, a support frame 53 may have an upwardly concave upper surface 53a on which the rollers 26a, 26b rolling ride for thereby tilting the seat 3 in the same direction that the steering wheel 6 is turned.

Although certain preferred embodiments of the present invention have been shown and described in detail, it should be understood that various changes and modifications may be made therein without departing from the scope of the appended claims.

What is claimed is:

1. A simulation apparatus comprising:
   a main assembly including an input unit operable by an operator;
   a seat for the operator to be seated thereon in confronting relation to said input unit;
   a support base;
   a swing frame supported on said support base for angular movement about a vertical axis, said seat being supported on said swing frame for angular movement about a horizontal axis transverse to said vertical axis;
   a support frame supporting said seat in spaced relation to said vertical axis, said support frame having a non-horizontal surface which supports said seat through two movable points which are symmetrical with respect to a center of said seat to provide for movement of said seat about said vertical and horizontal axes; and
   a linkage for moving said seat in response to operation of said input unit.

2. A simulation apparatus according to claim 1, wherein said linkage comprises a mechanical linkage operatively coupled between said input unit and said swing frame.

3. A simulation apparatus according to claim 1, wherein said linkage comprises a detector for detecting operation of said input unit, an actuator for actuating said swing frame, and a controller for controlling said actuator in response to an output signal from said detector.

4. A simulation apparatus according to claim 1, wherein said non-horizontal surface comprises an upwardly concave upper surface, said two movable points comprising respective rollers rotatably mounted on said support frame in rolling contact with said upwardly concave upper surface.

5. A seat support structure for simulation apparatus having a main assembly including an input unit operable by an operator, comprising:
   a seat for the operator to be seated thereon;
   a support base;
   a swing frame supported on said support base for angular movement about a vertical axis, said seat being supported on said swing frame for angular movement about a horizontal axis transverse to said vertical axis;
   a support frame supporting said seat in spaced relation to said vertical axis, said support frame having a non-horizontal surface which supports said seat through two movable points which are symmetrical with respect to a center of said seat to provide for movement of said seat about said vertical and horizontal axes; and
   a linkage for moving said seat in response to operation of said input unit.

6. A seat support structure according to claim 5, wherein said linkage comprises a detector for detecting operation of said input unit, an actuator for actuating said swing frame, and a controller for controlling said actuator in response to an output signal from said detector.

7. A seat support structure according to claim 5, wherein said curved surface comprises an upwardly concave upper surface, said two movable points comprising respective rollers rotatably mounted on said support frame in rolling contact with said upwardly concave upper surface.

8. A seat support structure according to claim 5, wherein said linkage comprises a mechanical linkage operatively coupled between said input unit and said swing frame.

9. A simulation apparatus comprising:
   a main assembly including an input unit operable by an operator;
   a seat for the operator to be seated thereon in confronting relation to said input unit;
   a support base;
   a swing frame supported on said support base for angular movement about a vertical axis, said seat being supported on said swing frame for angular movement about a horizontal axis transverse to said vertical axis;
   a support frame supporting said seat in spaced relation to said vertical axis, said support frame having surfaces which support said seat through two movable points which are symmetrical with respect to a center of said seat;
   said surfaces including two opposite slanted surface portions tapered downwardly in directions away from each other, said two movable points comprising respective rollers rotatably mounted on said support frame in rolling contact with said two opposite slanted surface parts, respectively; and a linkage for moving said seat in response to operation of said input unit.

10. A seat support structure for simulation apparatus having a main assembly including an input unit operable by an operator, comprising:

a seat for the operator to be seated thereon;

a support base;

a swing frame supported on said support base for angular movement about a vertical axis, said seat being supported on said swing frame for angular movement about a horizontal axis transverse to said vertical axis;

a support frame supporting said seat in spaced relation to said vertical axis, said support frame having a curved surface which supports said seat through two movable points which are symmetrical with respect to a center of said seat;

said curved surface comprising a concave upper surface, said two movable points comprising respective rollers rotatably mounted on said support frame in rolling contact with said concave upper surface; and a linkage for moving said seat in response to operation of said input unit.

11. A seat support structure for a simulation apparatus having a main assembly including an input unit operable by an operator, comprising:

a seat for the operator to be seated thereon;

a support base;

a swing frame supported on said support base for angular movement about a vertical axis, said seat being supported on said swing frame for angular movement about a horizontal axis transverse to said vertical axis;

a support frame supporting said seat in spaced relation to said vertical axis, said support frame having surfaces which support said seat through two movable points which are symmetrical with respect to a center of said seat;

said surfaces including two opposite slanted surface parts tapered downwardly in directions away from each other, said two movable points comprising respective rollers rotatably mounted on said support frame in rolling contact with said two opposite slanted surface parts, respectively; and a linkage for moving said seat in response to operation of said input unit.

12. A seat device for a simulation apparatus comprising:

a support base;

a swing frame movably mounted on said support base for swinging movement about a vertical axis;

a seat frame movably mounted on said swing frame for pivotal movement about a horizontal axis; and a support structure having a non-horizontal support surface spaced from said vertical axis, said support surface supporting said seat structure to provide for movement of said seat frame simultaneously about said vertical and horizontal axes.

13. A seat support for a simulation apparatus comprising:

a support base;

a swing frame movably mounted on said support base for swinging movement about a vertical axis;

a seat frame movably mounted on said swing frame for pivotal movement about a horizontal axis; and a support structure having a non-horizontal support surface spaced from said vertical axis, said seat frame having movable devices supported on said support surface to provide for movement of said seat frame simultaneously about said vertical and horizontal axes.

14. A seat support according to claim 13 wherein said movable devices are rollable devices rollably on said support surface, said rollable devices having rotatable axes disposed at an acute angle relative to said horizontal axis.

15. A seat support according to claim 13 wherein one of said movable devices is disposed on one side of a vertical plane containing said horizontal axis, and another of said movable devices is disposed on the opposite side of said vertical plane.

16. A seat support according to claim 13 wherein said support surface has two parts, one of said parts being disposed on one side of a vertical plane containing said horizontal axis, the other of said parts being disposed on the opposite side of said vertical plane, each of said support surface parts descending downwardly as said vertical plane is approached.

17. A seat support according to claim 13 wherein said support surface has a curved cross sectional configuration when viewed on a vertical cutting plane perpendicular to said horizontal axis.

18. A seat support according to claim 13 wherein said support structure is mounted on said support base.

19. A seat support according to claim 13 wherein said support surface has two parts, one of said parts being disposed on one side of a vertical plane containing said horizontal axis, the other of said parts being disposed on the opposite side of said vertical plane, each of said support surface parts rising upwardly as said vertical plane is approached.

20. A seat support according to claim 19 wherein said support surface parts are generally planar surfaces.

21. A simulation apparatus comprising:

a main assembly including an input unit operable by an operator;

a seat for the operator to be seated thereon in confronting relation to said input unit;

a support base;

a swing frame supported on said support base for angular movement about a vertical axis, said seat being supported on said swing frame for angular movement about a horizontal axis transverse to said vertical axis;

a support frame supporting said seat in spaced relation to said vertical axis, said support frame having a curved surface which supports said seat through two movable points which are symmetrical with respect to a center of said seat;

said curved surface comprising a concave upper surface, said two movable points comprising respective rollers rotatably mounted on said support frame in rolling contact with said concave upper surface; and a linkage for moving said seat in response to operation of said input unit.

* * * * *